(12) United States Patent
Gao

(10) Patent No.: US 11,308,014 B1
(45) Date of Patent: Apr. 19, 2022

(54) BI-DIRECTIONAL SIGNAL TRANSMISSION CONNECTION CABLE

(71) Applicant: LeRain Technology Co., Ltd., New Taipei (TW)

(72) Inventor: Miaobin Gao, New Taipei (TW)

(73) Assignee: LeRain Technology Co., Ltd., New Taipei (TW)

( * ) Notice: Subject to any disclaimer, the term of this patent is extended or adjusted under 35 U.S.C. 154(b) by 0 days.

(21) Appl. No.: 17/220,410

(22) Filed: Apr. 1, 2021

(30) Foreign Application Priority Data

Oct. 15, 2020 (TW) .................................. 109135735

(51) Int. Cl.
  *G06F 13/40* (2006.01)
  *G06F 13/42* (2006.01)
  *G06F 13/38* (2006.01)

(52) U.S. Cl.
  CPC .......... *G06F 13/4004* (2013.01); *G06F 13/38* (2013.01); *G06F 13/42* (2013.01); *G06F 2213/00* (2013.01)

(58) Field of Classification Search
  CPC ............. G06F 13/4004; G06F 13/4282; G06F 13/385; G06F 2213/042; G05B 2219/25181
  See application file for complete search history.

(56) References Cited

U.S. PATENT DOCUMENTS

| | | | | |
|---|---|---|---|---|
| 7,371,966 B2 * | 5/2008 | Meier | ...................... | H05K 1/147 174/70 S |
| 9,559,905 B2 * | 1/2017 | Chen | ................... | H04L 41/0816 |
| 9,568,530 B2 * | 2/2017 | Shoor | ...................... | H04B 3/46 |
| 9,875,210 B2 * | 1/2018 | Chen | ................... | G06F 13/4256 |
| 9,875,211 B2 * | 1/2018 | Shamarao | ........... | G06F 13/4282 |
| 9,940,298 B2 * | 4/2018 | Campbell | ........... | G06F 13/4081 |
| 9,965,439 B2 * | 5/2018 | Das Sharma | ....... | G06F 13/4068 |
| 9,966,705 B2 * | 5/2018 | Maeda | ............... | H01R 13/6461 |
| 10,409,752 B2 * | 9/2019 | Tao | .......................... | G06F 5/065 |
| 10,866,920 B2 * | 12/2020 | Lin | ...................... | G06F 13/4282 |
| 2016/0335222 A1 * | 11/2016 | Schnell | ............... | G06F 13/4286 |
| 2021/0209054 A1 * | 7/2021 | Wu | ...................... | G06F 13/4282 |

FOREIGN PATENT DOCUMENTS

CN            111556300 A         8/2020

* cited by examiner

*Primary Examiner* — Brian T Misiura
(74) *Attorney, Agent, or Firm* — Muncy, Geissler, Olds & Lowe, P.C.

(57) ABSTRACT

A bi-directional signal transmission connection cable is disclosed. The bi-directional signal transmission connection cable can be connected between a first and a second electronic device. The bi-directional signal transmission connection cable includes a first connection port, a second connection port, a first repeater chip, a second repeater chip and a plurality of transmission wires. The first and the second repeater chips are symmetrically disposed in the first and the second connection ports. The first repeater chip has a first set of adjustment parameters, and the second repeater chip has a second set of adjustment parameters. Thus, when a signal is transmitted between the first and the second electronic devices via the first connection port, the second connection port, and the plurality of transmission wires, the signal is adjusted by the first set of adjustment parameters and the second set of adjustment parameters.

7 Claims, 5 Drawing Sheets

BI-DIRECTIONAL SIGNAL TRANSMISSION CONNECTION CABLE

BACKGROUND OF THE INVENTION

1. Field of the Invention

The present invention relates to a bi-directional signal transmission connection cable, and particularly to a bi-directional signal transmission connection cable that can adjust a forward or a reverse signal.

2. Description of the Related Art

With the advancement of technology, the USB-C connection cable has become ubiquitous. The USB-C connection cable is a universal serial bus (USB) hardware interface. The biggest feature in appearance is that the upper and lower sides of the ports at both ends are exactly the same, so there is no need to distinguish between the top and the bottom of the port. In addition to the universal serial bus, the third-generation Thunderbolt can also be used with the USB-C connection cable. In addition, the DisplayPort (DP), which can provide high-speed transmission, can also be used with the USB-C connection cable. In the prior art, the USB-C connection cable uses its internal repeater chip to adjust the signal to prevent signal attenuation or distortion due to wire transmission.

Please refer to FIG. 1A for a schematic diagram of a USB-C connection cable to be connected in the forward direction to a first electronic device and a second electronic device of the prior art and FIG. 1B for a schematic diagram showing the USB-C connection cable to be connected in the reverse direction to the first electronic device and the second electronic device of the prior art.

In the prior art, the USB-C connection cable 90 is connected between a first electronic device 81 and a second electronic device 82 via a first connection port 91, a second connection port 92, and a transmission wire 93. The first electronic device 81 can be set as a main control host used to transmit a signal, and the second electronic device 82 can be set as a device to receive the signal. The first connection port 91 has a first repeater chip 911, and the second connection port 92 has a second repeater chip 921. The first repeater chip 911 and the second repeater chip 921 can adjust the signal, such as executing a gain adjustment or an equalization adjustment, to compensate for signal attenuation or distortion caused by the transmission process. As shown in 1A, the first repeater chip 911 can compensate for the attenuation or distortion of the signal transmitted from the first electronic device 81 to the first connection port 91, and the second repeater chip 921 can compensate for the attenuation or distortion of the signal transmitted through the transmission wire 93. However, when the USB-C cable 90 is reversely connected between the first electronic device 81 and the second electronic device 82, the first repeater chip 911 must use a program to assist in compensating for the attenuation or distortion of the signal transmitted through the transmission wire 93. The second repeater chip 921 also must use a program to assist in compensating for the attenuation or distortion of the signal transmitted from the first electronic device 81 to the second connection port 92. Therefore, when the USB-C cable 90 of the prior art is reversely connected, the first repeater chip 911 and the second repeater chip 921 cannot directly compensate for attenuation or distortion of the signal.

Therefore, it is necessary to invent a new bi-directional signal transmission connection cable to mitigate and/or obviate the aforementioned problems.

SUMMARY OF THE INVENTION

It is a major objective of the present invention to provide a bi-directional signal transmission connection cable that can adjust a forward or a reverse signal.

To achieve the above objective, a bi-directional signal transmission connection cable of the present invention is used for connecting between a first electronic device and a second electronic device. The bi-directional signal transmission connection cable comprises a first connection port, a second connection port, a first repeater chip, a second repeater chip, and a plurality of transmission wires. The first connection port or the second connection port can be connected to the first electronic device or the second electronic device, respectively. The first repeater chip and second repeater chip are symmetrically arranged in the first connection port and the second connection port, the first repeater chip has a first set of adjustment parameters, and the second repeater chip has a second set of adjustment parameters. The plurality of transmission wires are connected between the first repeater chip and the second repeater chip; thus, when a signal is transmitted between the first electronic device and the second electronic device via the first connection port, the second connection port, and the plurality of transmission wires, the signal is adjusted by the first set of adjustment parameters and the second set of adjustment parameters.

DETAILED DESCRIPTION CSF THE PREFERRED EMBODIMENT

Hereafter, the technical content of the present invention will be better understood with reference to preferred embodiments.

Figure 1A:
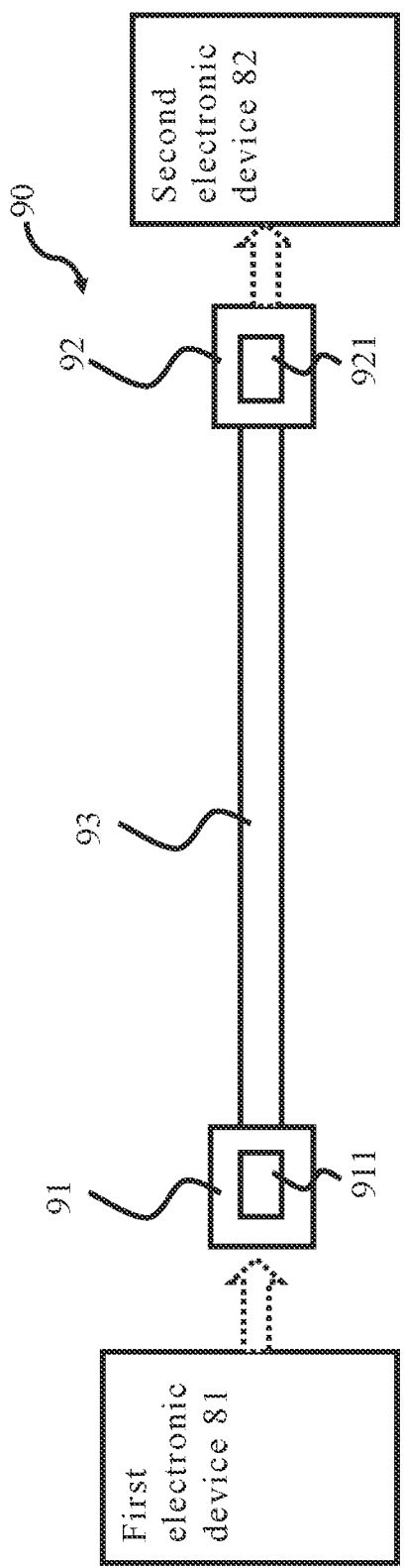
FIG. 1A is a schematic diagram of a bi-directional signal transmission connection cable to be forwardly connected between a first electronic device and a second electronic device of the prior art.
Figure 1B:
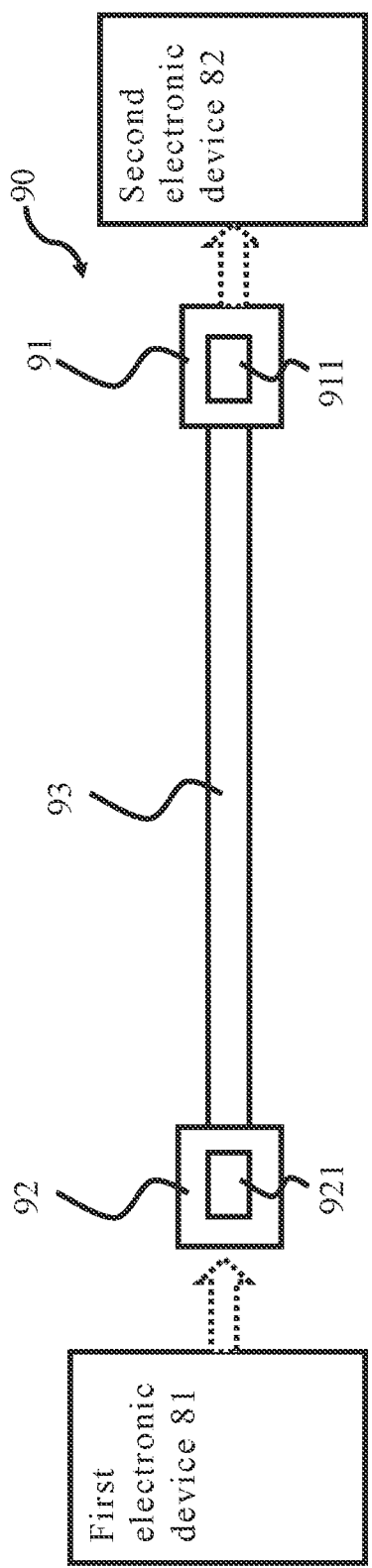
FIG. 1B is a schematic diagram of a bi-directional signal transmission connection cable to be reversely connected between a first electronic device and a second electronic device of the prior art.
Figure 2:
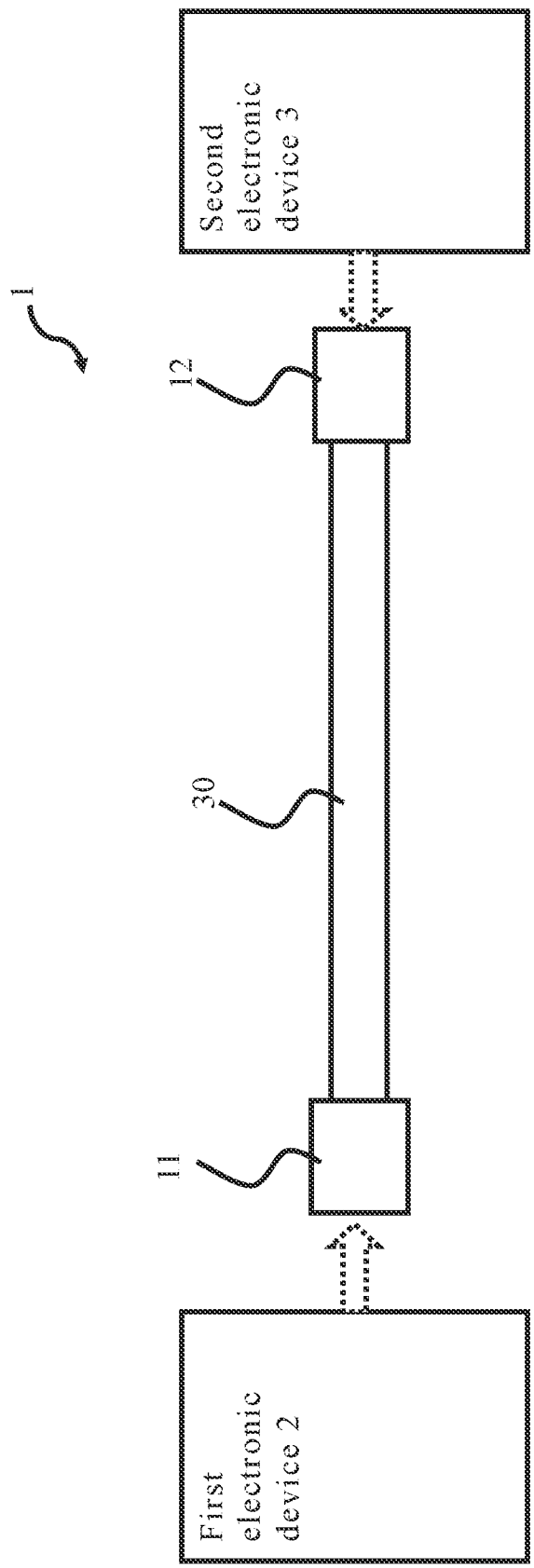
FIG. 2 is a schematic diagram of a bi-directional signal transmission connection cable to be connected between a first electronic device and a second electronic device of the present invention.

Please refer to FIG. 2 for a schematic diagram of a bi-directional signal transmission connection cable to be connected between a first electronic device and a second electronic device of the present invention.

In an embodiment of the present invention, the bi-directional signal transmission connection cable 1 can be a USB-C specification connection cable, which is suitable for a hardware interface form of the universal serial bus (USB) Thunderbolt, or DisplayPort (DP), but the present invention is not limited thereto. The bi-directional signal transmission connection cable 1 is connected between a first electronic device 2 and a second electronic device 3 via a first connection port 11 and a second connection port 12. Both the first electronic device 2 and the second electronic device can be desktop computer systems, notebook computers, smart phones, tablet computers, wearable devices or display screens, etc. The first electronic device 2 can be set as a main control host used to control and transmit a signal, and the second electronic device 3 can be set as a device to be connected and receive the signal, but the present invention is not limited thereto. According to the specifications of the USB-C, the shapes of the upper and lower sides of the first connection port 11 and the second connection port 12 are the same. Both ports have 24 pins arranged as 12 on each of the upper and lower sides. They are connected to a plurality of transmission wires 30 inside the bi-directional signal transmission connection cable 1. Thus, the first connection port 11 and the second connection port 12 can be connected to the first electronic device 2 and the second electronic device 3 on the front or back, and then the second electronic device 3 can use the plurality of transmission wires 30 to transmit signals in the forward or reverse direction. In one embodiment of the present invention, the bi-directional signal transmission connection cable 1 defines any signal transmitted from the first connection port 11 to the second connection port 12 as a forward signal, and any signal transmitted from the second connection port 12 to the first connection port 11 as a reverse signal. However, the forward signal and the reverse signal above mentioned are only examples, and the present invention is not limited to the above definitions. Since the connection method of the bi-directional signal transmission connection cable 1 is already known to those in the technical field of the present invention, it will not be further described here.

Figure 3:
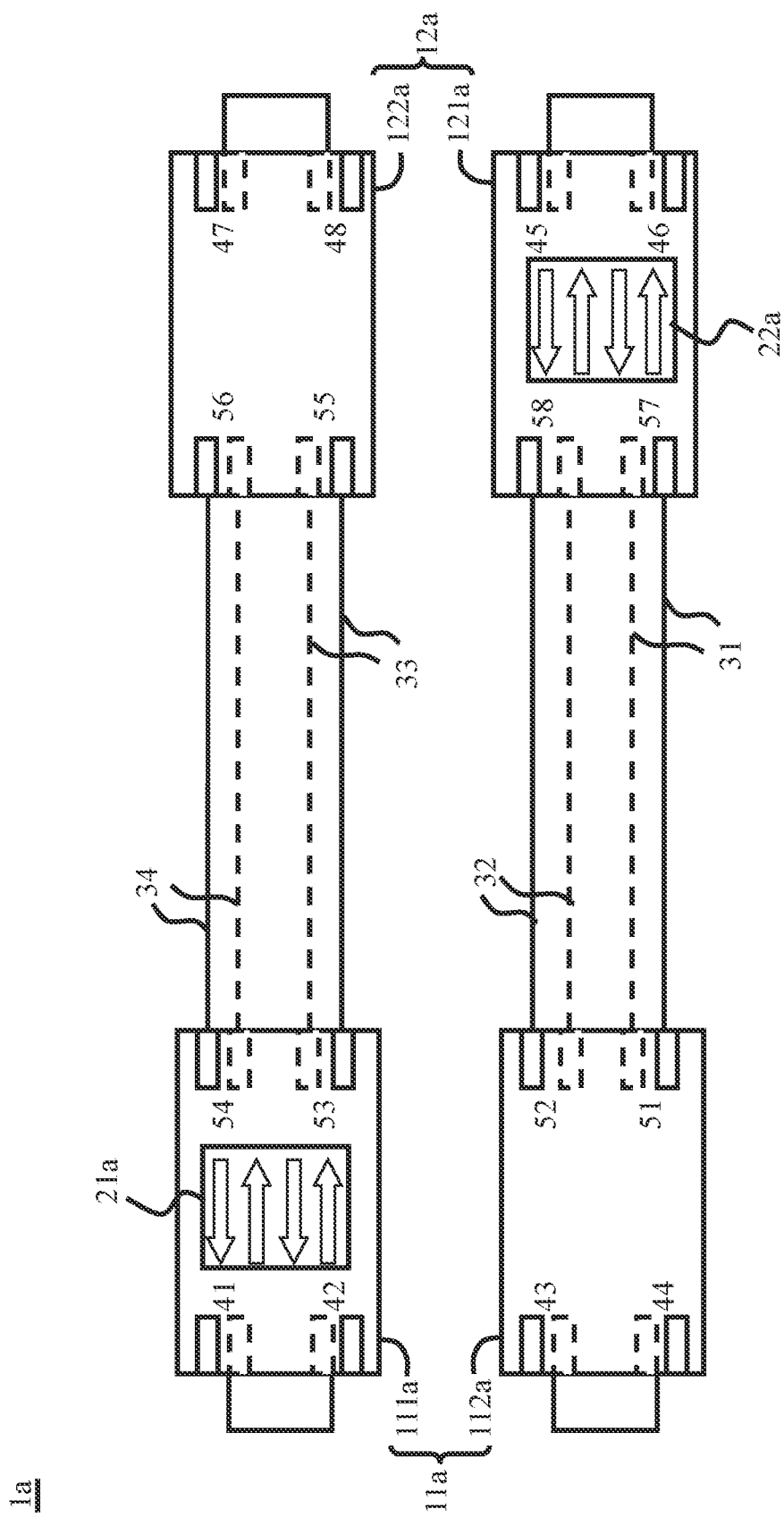
FIG. 3 is a schematic diagram of the structure of a lei-directional signal transmission connection cable in the first embodiment of the present invention.

Please refer to FIG. 3 for a schematic diagram of the structure of a bi-directional signal transmission connection cable in the first embodiment of the present invention.

In the first embodiment of the present invention, the first connection port 11a of the bi-directional signal transmission connection cable 1a has a first side 111a and a second side 112a, and the second connection port 12a has a first side 121a, and a second side 122a. The first side 111a of the first connection port 11a has two sets of connection pins 41 and 42, and the second side 112a also has two sets of connection pins 43 and 44. Further, the first side 121a of the second connection port 12a has two sets of connection pins 45 and 46, and the second side 122a has two sets of connection pins 47 and 48. The plurality of transmission wires 30 includes a first set of transmission wires 31, a second set of transmission wires 32, a third set of transmission wires 33, and a fourth set of transmission wires 34, The first connection port H a and the second connection port 12a are electrically connected to the abovementioned four sets of transmission wires 31, 32, 33, and 34 through the internal pins 51, 52, 53, 54, 55, 56, 57, and 58 respectively, Therefore, in the first embodiment of the present invention, the first side 111a of the first connection port 11a connects to the transmission wires 33 and 34 through the two sets of the internal pins 53 and 54, and then to the internal pins 55 and 56 of the second side 122a of the second connection port 12a. In addition, the second side 112a of the first connection port 11a connects to the transmission wires 31 and 32 through the two sets of internal pins 51 and 52, and then to the internal pins 57 and 58 of the first side 121a of the second connection port 12a. As a result, the first electronic device 2 can electrically connect to the connection pins 41, 42, 43, and 44, and the second electronic device 3 can electrically connect to the connection pins 45, 46, 47, and 48, so as to perform signal forward or reverse transmission through the internal connection pins 41, 42, 43, 44, 45, 46, 47, and 48, the transmission wires 31, 32, 33, and 34, and the internal pins 51, 52, 53, 54, 55, 56, 57, and 58 respectively. It should be noted that all of the connection pins 41, 42, 43, 44, 45, 46, 47, and 48, the transmission wires 31, 32, 33, and 34, and the internal pins 51, 52, 53, 54, 55, 56, 57, and 58 abovementioned have positive and negative channels. For example, as shown in FIG. 3, the solid line represents the positive channel, and the dashed line represents the negative channel. In addition, the internal circuit boards of the first connection port 11a and the second connection port 12a have at least one through hole (not shown via which the signal can be transmitted to the other side of the circuit board.

In the first embodiment of the present invention, the bi-directional signal transmission connection cable 1a has a first repeater chip 21a and a second repeater chip 22a. The first repeater chip 21a and the second repeater chip 22a are symmetrically disposed in the first connection port 11a and the second connection port 12a. In the first embodiment of the present invention, the first repeater chip 21a is disposed at the first side 111a of the first connection port 11a, and the second repeater chip 22a is disposed at the first side 121a of the second connection port 12a, Both the first repeater chip 21a and the second repeater chip 22a have four transmission channels. The first repeater chip 21a connects to the second side 122a of the second connection port 12a via two sets of transmission wires 33 and 34, and the second repeater chip 22a connects to the second side 112a of the first connection port 11a via the two sets of transmission wires 31 and 32.

Therefore, in the first embodiment of the present invention, the signal can have four forward or reverse transmission paths. The first transmission path is from the connection pin 42 to the first repeater chip 21a, the internal pin 52, the second set of transmission wires 32, the internal pin 58, the second repeater chip 22a, and the through hole to the connection pin 48. The second transmission path is from the connection pin 44 to the through hole, the first repeater chip 21a, the internal pin 54, the fourth set of transmission wires 34, the internal pin 56, the through hole, and the second repeater chip 22a to the connection pin 46, The third transmission path is from the connection pin 47 to the through hole, the second repeater chip 22a, the internal pin 57, the first set of transmission wires 31, the internal pin 51, the through hole, and the first repeater chip 21a to the connection pin 41. The fourth transmission path is from the connection pin 45 to the second repeater chip 22a, the through hole, the internal pin 55, the third set of transmission wires 33, the internal pin 53, the first repeater chip 21a, and the through hole to the connection pin 43. In the first embodiment of the present invention, the signal will be transmitted via the through holes twice.

The first repeater chip 21a and the second repeater chip 22a can be integrated circuit chips with Redriver or Retimer functions so as to adjust the signal. The Redriver function is used for increasing the attenuated frequency of the received degraded transmission signal and then retransmitting the signal which has been restored to the original level. The Retimer function is used for repairing the data clock signal with deterministic jitter and random jitter, and for increasing the signal transmission energy so as to output a clean signal. The above-mentioned Redriver function and Retimer function are already well known in the technical field of the present invention, so the principle will not be further described. Therefore, the first repeater chip 21a and the second repeater chip 22a can adjust the gain value or the equalization value of the signal to compensate for the signal attenuation or distortion caused by the transmission process. In the first embodiment of the present invention, the first repeater chip 21a has a first set of adjustment parameters and the second repeater chip 22a has a second set of adjustment parameters, wherein the first set of adjustment parameters has a first forward adjustment parameter and a second reverse adjustment parameter, and the second set of adjustment parameters has a second forward adjustment parameter and a second reverse adjustment parameter, wherein each adjustment parameter includes at least a gain adjustment parameter and an equalization adjust lent parameter. Therefore, whether a forward signal is transmitted from the first connection port 11a to the second connection port 12a or a reverse signal is transmitted from the second connection port 12a to the first connection port 11a, the first repeater chip 21a and the second repeater chip 22a can directly adjust the signal by using its adjustment parameter. It is not necessary to use additional program calculations to assist with compensation of the signal.

Therefore, in the cases of the first path and the second path, the first repeater chip 21a executes the gain adjustment and the equalization adjustment to compensate for the attenuation caused by the signal path from the first electronic device 2 to the first repeater chip 21a, and the second repeater chip 22a executes the gain adjustment and the equalization adjustment to compensate for the attenuation caused by the signal path from the first repeater chip 21a to the second repeater chip 22a. In the cases of the third path and the fourth path, the second repeater chip 22a executes the gain adjustment and the equalization adjustment to compensate for the attenuation caused by the signal path from the third electronic device 3 to the second repeater chip 22a, and the first repeater chip 21a executes the gain adjustment and the equalization adjustment to compensate for the attenuation caused by the signal path from the second repeater chip 22a to the first repeater chip 21a.

As can be seen from the above description, the bi-directional signal transmission connection cable 1a of the present invention can reduce the number of chips. In addition, the internal lines of the bi-directional signal transmission connection cable 1a are symmetrical to each other, and the bi-directional signal transmission connection cable 1a will not affect the signal transmission between the first electronic device 2 and the second electronic device regardless of whether it is turned over. Furthermore, whether a forward signal or a reverse signal is transmitted, the compensation adjustment can also be executed on these signals.

Figure 4:
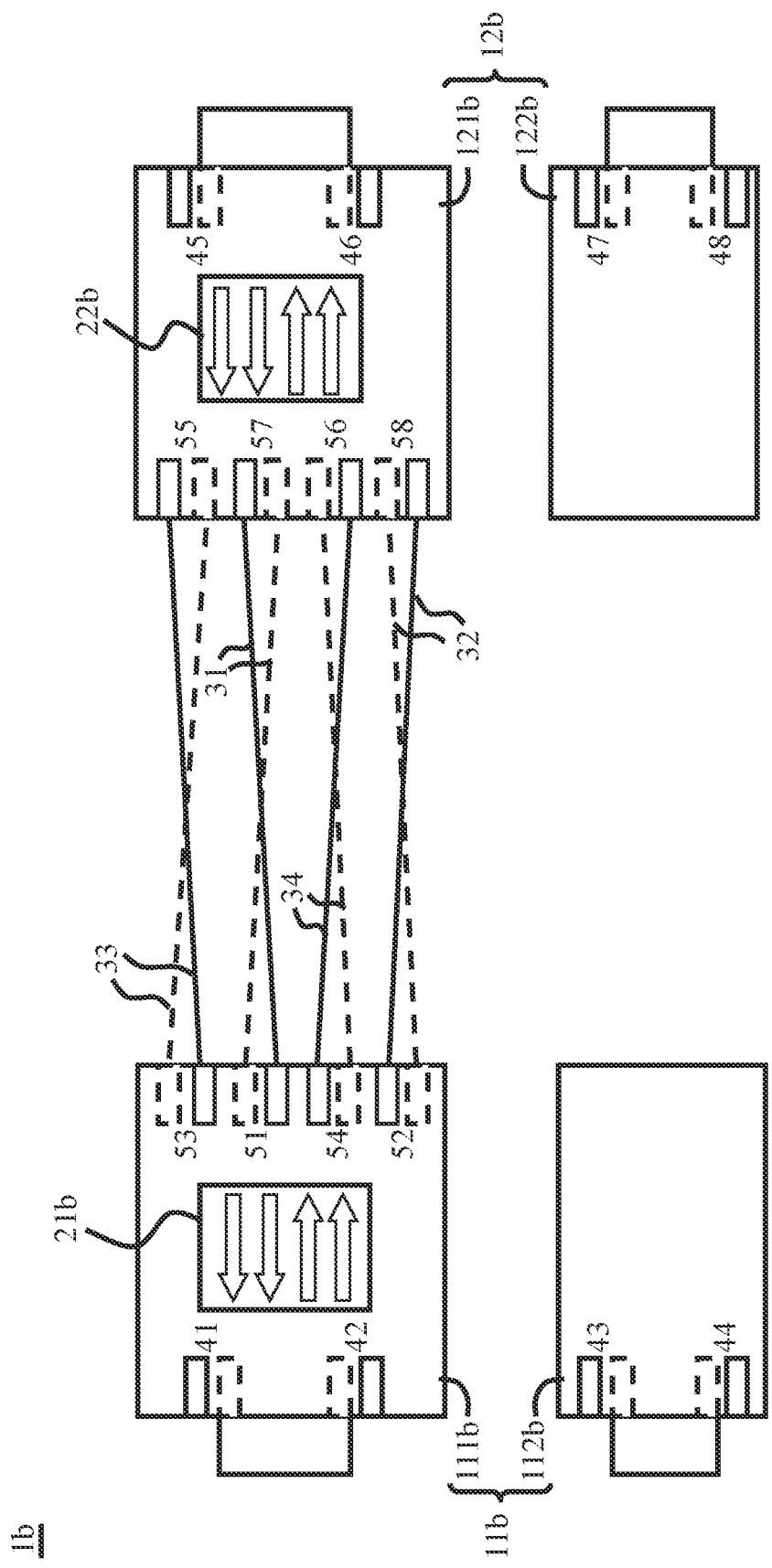
FIG. 4 is a schematic diagram of the structure of a bi-directional signal transmission connection cable in the second embodiment of the present invention.

Please refer to FIG. 4 for a schematic diagram of the structure of a bi-directional signal transmission connection cable in the second embodiment of the present invention.

In the second embodiment of the present invention, the first connection port 11b of the bi-directional signal transmission connection cable 1b has a first side 111b and a second side 112b; the second connection port 12b has a first side 121b and a second side 122b. The first side 111b of the first connection port 11b has two sets of connection pins 41, 42, and the second side 112b also has two sets of connection pins 43, 44. In addition, the first side 121b of the second connection port 12b has two sets of connection pins 45, 46, and the second side 122b has two sets of connection pins 47, 48. The first connection port 11b and the second connection port 12b are electrically connected to the transmission wires 31, 32, 33, and 34 above mentioned via the internal pins 51, 52, 53, 54, 55, 56, 57, and 58 respectively. The difference from the first embodiment is that the first side 111b of the first connection port 11b of the second embodiment is connected to the transmission wires 31, 32, 33, and 34 via four sets of internal pins 51, 52, and 53, and 54, and then connected to the four sets of the internal pins 55, 56, 57, and 58 of the first side 121b of the second connection port 12b. In addition, the positive and negative channels which belong to the transmission wires 31, 32, 33, and 34 are cross-connected to the four sets of internal pins 55, 56, 57, and 58 of the first side 121b. As a result, the first electronic device 2 can also be connected to the connection pins 41, 42, 43, and 44, and the second electronic device 3 can also be connected to the connection pins 45, 46, 47, and 48. Thus, the signal can be forward or reverse transmitted through the connection pins 41, 42, 43, 44, 45, 46, 47, and 48, the transmission wires 31, 32, 33, and 34, and the internal pins 51, 52, 53, 54, 55, 56, and 58.

In the second embodiment of the present invention, the first repeater chip 21b of the bi-directional signal transmission connection cable 1b is disposed at the first side 111b of the first connection port 11b, and the second repeater chip 22b is disposed at the first side 121b of the second connection port 12b. The first repeater chip 21b is connected to the second repeater chip 22b via the four sets of transmission wires 31, 32, 33, and 34. The first repeater chip 21b and the second repeater chip 22b also have four sets of transmission channels.

Therefore, in the second embodiment of the present invention, the signal can also have four forward or reverse transmission paths. The first path is from the connection pin 42 to the first repeater chip 21b, the internal pin 52, the second set of transmission wires 32, the internal pin 58, the second repeater chip 22b, and the through hole to the connection pin 48. The second path is from the connection pin 44 to the through hole, the first repeater chip 21b, the internal pin 54, the fourth set of transmission wires 34, the internal pin 56, and the second repeater chip 22b to the connection pin 46. The third path is from the connection pin 47 to the through hole, the second repeater chip 22b, the internal pin 57, the first set of transmission wires 31, the internal pin 51, and the first repeater chip 21b to the connection pin 41. The fourth path is from the connection pin 45 to the second repeater chip 22h, the internal pin 55, the third set of transmission wires 33, the internal pin 53, the first repeater chip 21b, and the through hole to the connection pin 43. In the second embodiment of the present invention, the signal will only be transmitted via the through holes once.

Therefore, in the cases of the first path and the second path, the first repeater chip 21b executes the gain adjustment and the equalization adjustment to compensate for the attenuation caused by the signal path from the first electronic device 2 to the first repeater chip 21b, and the second repeater chip 22b executes the gain adjustment and the equalization adjustment to compensate for the attenuation caused by the signal path from the first repeater chip 21b to the second repeater chip 22b. In the cases of the third path and the fourth path, the second repeater chip 22b executes the gain adjustment and the equalization adjustment to compensate for the attenuation caused by the signal path from the third electronic device 3 to the second repeater chip 22b, and the first repeater chip 21b executes the gain adjustment and the equalization adjustment to compensate for the attenuation caused by the signal path from the second repeater chip 22b to the first repeater chip 21b.

As can be seen from the above description, the bi-directional signal transmission connection cable 1b of the second embodiment of the present invention can also reduce the number of chips. The internal pins 51, 52, 53, 54, 55, 56, 57, and 58 are all disposed on the same side so as to make the welding process more convenient. In addition, the internal lines of the bi-directional signal transmission connection cable 1b are symmetrical to each other. The positive channel and negative channel of each transmission wire 31, 32, 33, and 34 are cross-connected to the internal pin on the other side so as to match the polarity of the 24 pins of the first connection port 11b and the second connection port 12b. Thus, the bi-directional signal transmission connection cable 1b will not affect the signal transmission between the first electronic device 2 and the second electronic device regardless of whether it is turned over. Furthermore, whether a forward signal or a reverse signal is transmitted, the compensation adjustment can also be executed on these signals. The structure of the cross-connection of the positive channel and the negative channel is able to make the bi-directional signal transmission connection cable 1b easier to be applied and managed., and can reduce manufacturing costs.

Figure 5:
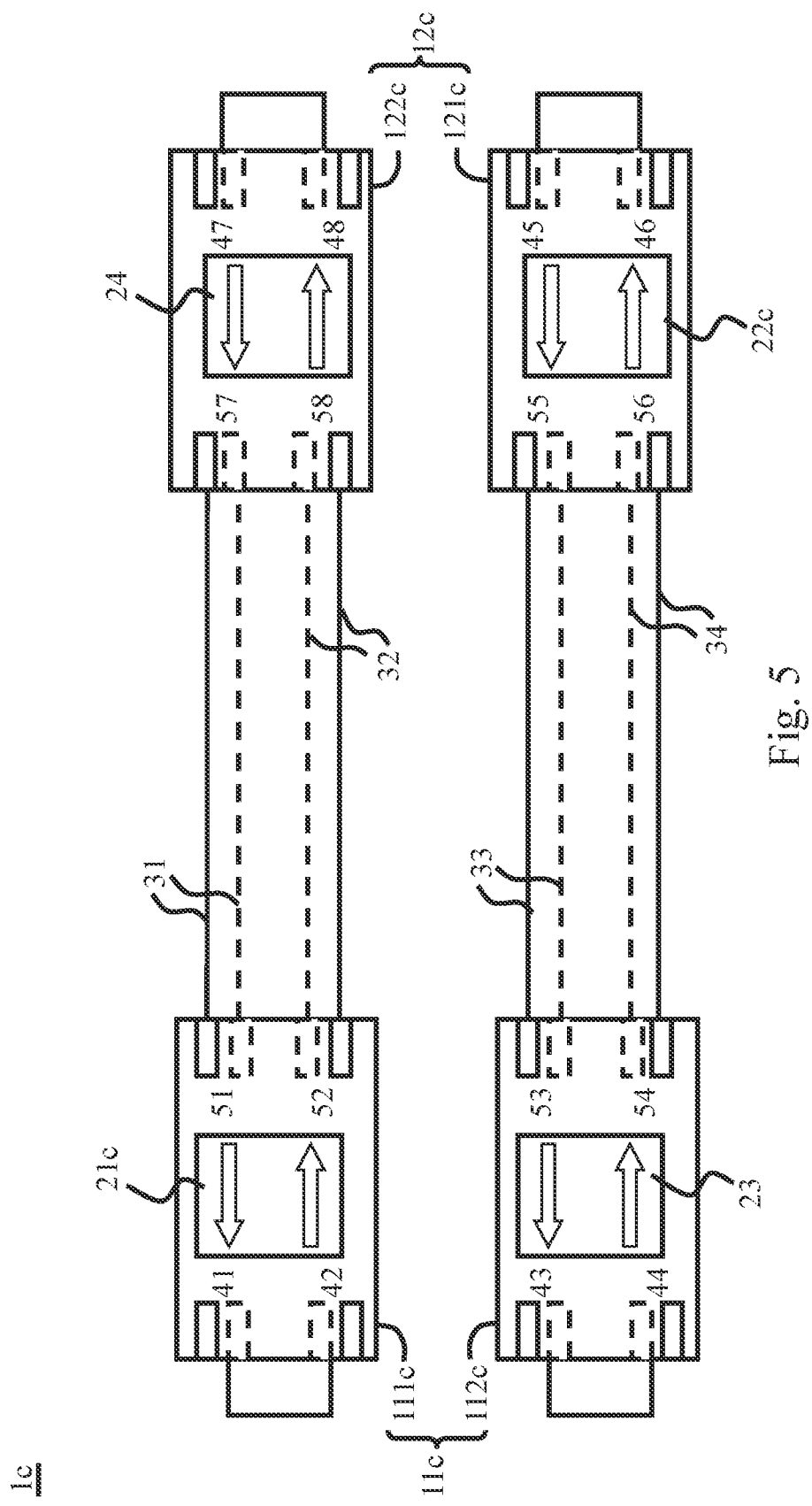
FIG. 5 is a schematic diagram of the structure of the bi-directional signal transmission connection cable in the third embodiment of the present invention.

Finally, please refer to FIG. 5 for a schematic diagram of the structure of the bi-directional signal transmission connection cable in the third embodiment of the present invention.

In the third embodiment of the present invention, the first connection port 11c of the bi-directional signal transmission connection cable 1c has a first side 111c and a second side 112c, and the second connection port 12c has a first side 121c and a second side 122c. The first side 111c of the first connection port 11c has two sets of connection pins 41 and 42, and the second side 112c also has two sets of connection pins 43 and 44. In addition, the first side 121c of the second connection port 12c has two sets of connection pins 45 and 46, and the second side 122c has two sets of connection pins 47 and 48. The first connection port 11c and the second connection port 12c electrically connect to the four sets of transmission wires 31, 32, 33, and 34 above mentioned via the internal bins 51, 52, 53, 54, 55, 56, 57, and 58 respectively. Therefore, in the third embodiment of the present invention, the first side 111c of the connection port 11c connects to the transmission wires 31 and 32 via two sets of internal pins 51 and 52, and it then connects to the internal pins 55 and 56 of the second side 122c of the second connection port 12c. Furthermore, the second side 112c of the first connection port 11c connects to the transmission wires 33 and 34 via, two sets of the internal pins 53 and 54, and it then connects to the internal pins 57 and 58 of the first side 121c of the second connection port 12c. Therefore, the first electronic device 2 can electrically connect to the connection pins 41, 42, 43, and 44, and the second electronic device 3 can electrically connect to the connection pins 45, 46, 47, and 48, so as to forward or reverse transmit a signal through the connection pins 41, 42, 43, 44, 45, 46, 47, and 48, the transmission wires 31, 32, 33, and 34, and the internal pins 51, 52, 53, 54, 55, 56, 57, and 58.

In the third embodiment of the present invention, the bi-directional signal transmission connection cable 1c has a first repeater chip 21c and a second repeater chip 22c, and it further comprises a third repeater chip 23 and a fourth repeater chip 24. The third repeater chip 23 and the fourth repeater chip 24 have the same functions as the first repeater chip 21c and second repeater chip 22c. They all have two sets of transmission channels and can execute gain adjustment or equalization adjustment of the signal to compensate for signal attenuation or distortion caused by the transmission process. Therefore, the third repeater chip 23 has a third set of adjustment parameters, and the fourth repeater chip 24 has a fourth set of adjustment parameters. The third set of adjustment parameters comprises a third forward adjustment parameter and a third reverse adjustment parameter, and the fourth set of adjustment parameters comprises a fourth forward adjustment parameter and a fourth reverse adjustment parameter. Because the third set of adjustment parameters and the fourth set of adjustment parameters are substantially the same as the first set of adjustment parameters and the second set of adjustment parameters, there is no need to describe these adjustment parameters.

In the third embodiment of the present invention, the first repeater chip 21c, the second repeater chip 22c, the third repeater chip 23, and the fourth repeater chip 24 are symmetrically disposed into the first connection port 11c and the second connection port 12c. The first repeater chip 21c is disposed at the first side 111c of the first connection port 11c, the second repeater chip 22c is disposed at the first side 121c of the second connection port 12c, the third repeater chip 23 is disposed at the second side 112c of the first connection port 11c, and the fourth repeater chip 24 is disposed at the second side 122c of the second connection port 12c. The first repeater chip 21c is connected to the fourth repeater chip 24 of the second side 122c of the second connection port 12c via two sets of transmission wires 31 and 32, and the second repeater chip 22c is connected to the third repeater chip 23 of the second side 112c of the first connection port 11c.

Thus, in the third embodiment of the present invention, the signal also has four forward or reverse transmission paths. The first path is from the connection pin 42 to the first repeater chip 21c, the internal pin 52, the second set of transmission wires 32, the internal pin 58, and the fourth repeater chip 24 to the connection pin 48. The second path is from the connection pin 44 to the third repeater chip 23, the internal pin 54, the fourth set of transmission vires 34, the internal pin 56, and the second repeater chip 22c to the connection pin 46. The third path is from the connection pin 47 to the fourth repeater chip 24, the internal pin 57, the first set of transmission wires 31, the internal pin 51, and the first repeater chip 21c to the connection pin 41. The fourth path is from the connection pin 45 to the second repeater chip 22c, the internal pin 55, the third set of transmission wires 33, the internal pin 53 and the third repeater chip 23 to the connection pin 43.

Therefore, in the case of the first path, the first repeater chip 21c executes the gain adjustment and the equalization adjustment to compensate for the attenuation caused by the signal path from the first electronic device 2 to the first repeater chip 21c, and the fourth repeater chip 24 executes the gain adjustment and the equalization adjustment to compensate for the attenuation caused by the signal path from the first repeater chip 21c to the fourth repeater chip 24. In the case of the second path, the third repeater chip 23 executes the gain adjustment and the equalization adjustment to compensate for the attenuation caused by the signal path from the first electronic device 2 to the third repeater chip 23, and the second repeater chip 22c executes the gain adjustment and the equalization adjustment to compensate for the attenuation caused by the signal path from the third repeater chip 23 to the second repeater chip 22c. In the case of the third path, the fourth repeater chip 24 executes the gain adjustment and the equalization adjustment to compensate for the attenuation caused by the signal path from the second electronic device 3 to the fourth repeater chip 24, and the first repeater chip 21c executes the gain adjustment and the equalization adjustment to compensate for the attenuation caused by the signal path from the fourth repeater chip 24 to the first repeater chip 21c. In the case of the fourth path, the second repeater chip 22c executes the gain adjustment and the equalization adjustment to compensate for the attenuation caused by the signal path from the second electronic device 3 to the second repeater chip 22c, and the third repeater chip 23 executes the gain adjustment and the equalization adjustment to compensate for the attenuation caused by the signal path from the second repeater chip 22c to the third repeater chip 23.

According to the above description, the signal of the bi-directional signal transmission connection cable 1c in the third embodiment of the present invention will not be transmitted via the through hole. Moreover, the internal lines of the bi-directional signal transmission connection cable 1c are symmetrical to each other, and the bi-directional signal transmission connection cable 1c does not affect the connection with the first electronic device 2 and the second electronic device 3 after being turned over. Furthermore, whether a forward signal or a reverse signal is transmitted, the compensation adjustment can also be executed on these signals.

It can be seen from the above description that the bi-directional signal transmission connection cables 1, 1a, 1b, or 1c of the present invention can transmit the signal in the forward or reverse direction regardless of whether it is turned over and can also prevent signal attenuation or distortion. Furthermore, the bi-directional signal transmission connection cables 1, 1a, 1b, or 1c have the effect of saving energy and simplifying the control circuit.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A bi-directional signal transmission connection cable used for connecting between a first electronic device and a second electronic device, the bi-directional signal transmission connection cable comprising:
   a first connection port, wherein a first side and a second side of the first connection port each have two sets of connection pins to be electrically connected to the first electronic device;
   a second connection port, wherein a first side and a second side of the second connection port each have two sets of connection pins to be electrically connected to the second electronic device;
   a first repeater chip, disposed at the first side of the first connection port;
   a second repeater chip, disposed at the first side of the second connection port, wherein the first repeater chip and the second repeater chip are symmetrically arranged in the first connection port and the second connection port, the first repeater chip has a first set of adjustment parameters, and the second repeater chip has a second set of adjustment parameters, wherein the first set of adjustment parameters comprises a first forward adjustment parameter and a first reverse adjustment parameter, and the second set of adjustment parameters comprises a second forward adjustment parameter and a second reverse adjustment parameter, wherein each adjustment parameter includes at least a gain adjustment parameter and an equalization adjustment parameter; and
   a plurality of transmission wires, including a first set of transmission wires, a second set of transmission wires, a third set of transmission wires, and a fourth set of transmission wires and connected between the first repeater chip and the second repeater chip; wherein:
   the first side of the first connection port and the second side of the second connection port are each connected to two sets of transmission wires via two sets of internal pins; the first repeater chip of the first side of the first connection port is connected to the second side of the second connection port via two sets of transmission wires; and
   the second side of the first connection port and the first side of the second connection port are each connected to two sets of transmission wires via two sets of internal pins; the second side of the first connection port is connected to the second repeater chip of the first side of the second connection port via two sets of transmission wires;
   thus, when a signal is transmitted between the first electronic device and the second electronic device via the first connection port, the second connection port, and the plurality of transmission wires, the signal is adjusted by the first set of adjustment parameters and the second set of adjustment parameters, wherein the plurality of transmission wires.

2. The bi-directional signal transmission connection cable as claimed in claim 1, wherein the first connection port and the second connection port have at least one through hole, and the signal is transmitted from any one connection port to another connection port via two through holes.

3. A bi-directional signal transmission connection cable, used for connecting between a first electronic device and a second electronic device, the bi-directional signal transmission connection cable comprising:
   a first connection port, wherein a first side and a second side of the first connection port each have two sets of connection pins to be electrically connected to the first electronic device;
   a second connection port, wherein a first side and a second side of the second connection port each have two sets of connection pins to be electrically connected to the second electronic device:
   a first repeater chip, disposed at the first side of the first connection port;
   a second repeater chip, disposed at the first side of the second connection port; wherein the first repeater chip and the second repeater chip are symmetrically arranged in the first connection port and the second connection port, the first repeater chip has a first set of adjustment parameters, and the second repeater chip has a second set of adjustment parameters, wherein the first set of adjustment parameters comprises a first forward adjustment parameter and a first reverse adjustment parameter, and the second set of adjustment parameters comprises a second forward adjustment parameter and a second reverse adjustment parameter, wherein each adjustment parameter includes at least a gain adjustment parameter and an equalization adjustment parameter; and
   a plurality of transmission wires, including a first set of transmission wires, a second set of transmission wires, a third set of transmission wires, and a fourth set of transmission wires and connected between the first repeater chip and the second repeater chip; wherein the first side of the first connection port and the first side of the second connection port are connected to four sets of transmission wires via four sets of internal pins respectively, the first connection port and the second connection port have at least one through hole, and the signal is transmitted from any one connection port to another connection port via the through hole once;

thus, when a signal is transmitted between the first electronic device and the second electronic device via the first connection port, the second connection port, and the plurality of transmission wires, the signal is adjusted by the first set of adjustment parameters and the second set of adjustment parameters, wherein the plurality of transmission wires.

4. The bi-directional signal transmission connection cable as claimed in claim 3, wherein a positive channel and a negative channel of the four sets of transmission wires are cross-connected to the internal pin of another connection port.

5. A bi-directional signal transmission connection cable used for connecting between a first electronic device and a second electronic device, the bi-directional signal transmission connection cable comprising:

a first connection port, wherein a first side and a second side of the first connection port each have two sets of connection pins to be electrically connected to the first electronic device;

a second connection port, wherein a first side and a second side of the second connection port each have two sets of connection pins to be electrically connected to the second electronic device;

a first repeater chip, disposed at the first side of the first connection port;

a second repeater chip, disposed at the first side of the second connection port, wherein the first repeater chip and the second repeater chip are symmetrically arranged in the first connection port and the second connection port, the first repeater chip has a first set of adjustment parameters, and the second repeater chip has a second set of adjustment parameters, wherein the first set of adjustment parameters comprises a first forward adjustment parameter and a first reverse adjustment parameter, and the second set of adjustment parameters comprises a second forward adjustment parameter and a second reverse adjustment parameter, wherein each adjustment parameter includes at least a gain adjustment parameter and an equalization adjustment parameter;

a plurality of transmission wires, including a first set of transmission wires, a second set of transmission wires, a third set of transmission wires, and a fourth set of transmission wires and connected between the first repeater chip and the second repeater chip, wherein the first side of the first connection port and the second side of the second connection port are each connected to two sets of transmission wires via two sets of internal pins; the second side of the first connection port and the first side of the second connection port are each connected to two sets of transmission wires via two sets of internal pins;

a third repeater chip, disposed at the second side of the first connection port; and a fourth repeater chip, disposed at the second side of the second connection port, wherein the third repeater chip and the fourth repeater chip are symmetrically arranged with each other; thus, when a signal is transmitted between the first electronic device and the second electronic device via the first connection port, the second connection port, and the plurality of transmission wires, the signal is adjusted by the first set of adjustment parameters and the second set of adjustment parameters, wherein the plurality of transmission wires.

6. The bi-directional signal transmission connection cable as claimed in claim 5, wherein:

the first repeater chip is connected to the fourth repeater chip via two sets of transmission wires; and the second repeater chip is connected to the third repeater chip via two sets of transmission wires.

7. The bi-directional signal transmission connection cable as claimed in claim 5, wherein:

the third repeater chip has a third set of adjustment parameters which comprises a third forward adjustment parameter and a third reverse adjustment parameter; and the fourth repeater chip has a fourth set of adjustment parameters which comprises a fourth forward adjustment parameter and a fourth reverse adjustment parameter, wherein each adjustment parameter includes at least a gain adjustment parameter and an equalization adjustment parameter.

\* \* \* \* \*